United States Patent [19]

Levinson et al.

[11] Patent Number: 4,542,502
[45] Date of Patent: Sep. 17, 1985

[54] RECONFIGURABLE COLLISION AVOIDING SYSTEM, STATION AND PROTOCOL FOR A TWO PATH MULTIPLE ACCESS DIGITAL COMMUNICATIONS SYSTEM

[75] Inventors: Frank H. Levinson, Hanover Township, Morris County; John O. Limb, Berkeley Heights, both of N.J.

[73] Assignee: AT&T Bell Laboratories, Murray Hill, N.J.

[21] Appl. No.: 567,350

[22] Filed: Dec. 30, 1983

[51] Int. Cl.$^4$ ............................................. H04J 3/00
[52] U.S. Cl. ........................................ 370/88; 370/94
[58] Field of Search ...................... 370/86, 88, 13, 89, 370/85

[56] References Cited

U.S. PATENT DOCUMENTS

| | | | |
|---|---|---|---|
| 3,652,798 | 3/1972 | McNeilly et al. | 370/88 |
| 3,851,104 | 11/1974 | Willard et al. | 179/15 |
| 3,904,829 | 9/1975 | Martin et al. | 370/86 |
| 4,063,220 | 12/1977 | Metcalfe et al. | 340/147 |
| 4,161,786 | 7/1979 | Hopkins et al. | 364/900 |
| 4,210,780 | 7/1980 | Hopkins et al. | 370/80 |
| 4,334,305 | 6/1982 | Girardi | 370/86 |
| 4,383,314 | 5/1983 | Tam | 370/86 |
| 4,400,994 | 7/1984 | Scanlon et al. | 370/88 |

OTHER PUBLICATIONS

Electronics Letters; "Bidirectional Fibre Optic Loop-Structured Network"; Jan. 22, 1981; Ito et al., vol. 17, No. 2, pp. 84–85.
Proceedings Computer Network Protocols Symposium, "The Mininet Inter–Node Control Protocol"; R. C. S. Morling et al., pp. B4-1 to B4-6-Feb. 13-15, 1978.
Proceedings of the Local Area Communications Network Symposium, May 1979, "Multimode Communications on the MITRENET", G. T. Hopkins, pp. 165–177.
EEM Electron ENG MAS, 1980/81, vol. 2, 1980, "Directional Couplers", as Manufactured by Mini-Circuits, pp. 3312-3315.

Primary Examiner—Douglas W. Olms
Assistant Examiner—Frank M. Scutch, III
Attorney, Agent, or Firm—Richard J. Roddy; Erwin W. Pfeifle

[57] ABSTRACT

In order to control the transfer of packets of information among a plurality of stations, e.g., digital computers, the instant communications system, station and protocol contemplate first and second oppositely directed signal paths. At least two stations are coupled to both the first and the second signal paths. A station includes arrangements for reading (and writing) signals from (and on) each of the two paths. Signals are read from either path by an arrangement which electrically precedes the arrangement for writing signals on the path. If the station has a packet to transmit, it can overwrite a busy control field of a packet on either path. Also having read a packet signal from the path, a logical interpretation may be made within the station as to whether the path is busy or is not busy. If the path is not busy, the packet may be written on the path by overwriting any signal thereon. If the path is busy, the station may defer the writing until the path is detected as not busy e.g. by reading a busy control field of another packet. Here the two paths are coupled to form two ring structures so the packets flow down the path to a destination station. Eventually all packets will be transmitted and the busy control field loops around to a station which is designated as a control station. The control station, responsive to detecting that all packets have been transmitted on one of the paths, may transmit a start cycle packet on the one path, responsive to which event a new cycle may be started by initializing each station on the one path and by permitting each initialized station to transmit. In the event of an electrical open, the system, station and protocol are adapted to reconfigure the system so that the station electrically preceding the open functions as an end station while the station electrically succeeding the open functions as a head station.

14 Claims, 5 Drawing Figures

FIG. 2

LOGIC VALUE  0 1 1 1 0 1 1 0 0 1 1

| BIPOLAR VIOLATIONS | BARKER SEQUENCE | PACKET 1 | ... | PACKET M |

SYNC BURST

FIG. 4

BITS | 1 | 2 | 3 | 4 | 5 | 6 | 7 | 8 | ... | K |

| START CYCLE | END CYCLE | DEAD | DEAD | BUSY | DEAD | DEAD | DEAD | 8 BITS DESTINATION ADDRESS | 8 BITS SOURCE ADDRESS | 128 BITS DATA | 8 BITS CRC |

RECONFIGURABLE COLLISION AVOIDING SYSTEM, STATION AND PROTOCOL FOR A TWO PATH MULTIPLE ACCESS DIGITAL COMMUNICATIONS SYSTEM

TECHNICAL FIELD

This invention relates to communications systems and, more particularly, to multiple access digital communications systems, stations and protocols for use therein.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals. For example, U.S. Pat. No. 3,851,104, entitled "Digital Communications System" and issued Nov. 26, 1974, discloses a time division, multiple access communications system which, under the control of a central terminal, provides communication links among a plurality of user terminals by way of a single communications signal path.

As the digital computer art advanced, parallel advances in the semiconductor art have lead to smaller, relatively inexpensive computers. With the advent of such smaller computers, the technique of central computer control is being abandoned in favor of a distributed control technique. Also, because of the usually bursty nature of digital information, the recent trend has also been toward communications systems having a capability for handling packets of digital information. One such distributed control communications system is disclosed in U.S. Pat. No. 4,063,220, entitled "Multipoint Data Communication System with Collision Detection" and issued Dec. 13, 1977. Indeed, the '220 patent discloses a communications system in which, when a terminal is to start an intended transmission on a communications path, a phased decoder detects the presence of other transmissions on the path and, responsive thereto, delays the intended transmission until no other transmissions are sensed. Once a transmission has started, if an interference (or collision) therewith is detected, a random number generator is used to select an interval of time at the completion of which the next transmission will be attempted.

Collisions being a problem, efforts exist toward providing communication protocols for mitigating the deleterious effects of collisions. For example, a copending application by C. Flores, B. Gopinath and J. O. Limb, i.e., Ser. No. 399,428, entitled "Collision Avoiding System and Protocol for a Two Path Multiple Access Digital Communications System", and filed July 19, 1982, which application is herein incorporated by reference, discloses a communications system, station and protocol which contemplate first and second oppositely directed signal paths. At least two stations are coupled to both the first and the second signal paths. A station includes arrangements for reading one signal from the first path and for writing another signal on the first path. The one signal is read from the first path by an arrangement which electrically precedes the arrangement for writing the other signal on the first path. A similar read arrangement is electrically preceding a write arrangement on the second path. If the station has a packet to transmit, it can overwrite a busy control field of a signal packet on either path. The station can also read packets on either path. Having read a signal packet on a path, a logical interpretation may be made within the station as to whether the path is busy or is not busy. If a path is not busy, the packet may be written on the path by overwriting any signal thereon. If the path is busy, the station may defer the writing of a packet until the path is detected as not busy, i.e. through the contents of a busy control field. The packets flow down a respective path to a destination station. Eventually all packets will be transmitted and the busy control field may be detected at an end station for indicating the event that all packets have been transmitted. The end station on one path acts as the head station on the other oppositely directed path. Hence, responsive to detecting that all packets hve been transmitted, the end station on the one path, which is the head station on the other path, may transmit an end cycle packet on the other path, responsive to the detection of which event a start cycle packet is written by the head station on the one path whereby a new cycle may be started by initializing each station on the one path and by permitting each such initialized station to transmit one or more packets.

Still alternative solutions are being sought to further improve the efficiency of such systems, for example, to mitigate propagation delay time or to adapt to a situation where a signal path becomes broken or electrically open, perhaps because of a natural disaster.

SUMMARY OF THE INVENTION

These and other problems are solved in accordance with the principles of the instant invention in which an improved communications system, station and protocol for use in a communications system may be used to avoid collisions on a communications path, to improve the efficiency of the system by mitigating propagation delay at relatively high digital bit rates and to reconfigure the system in the presence of an electrically open signal path. The communications system includes first and second oppositely directed, unidirectional communications signal paths. The respective paths are close connected to form two unidirectional rings. Each of at least two stations such as a digital computer is coupled to both the first and the second paths and hence to the two rings. Each station has an arrangement for reading the signals from the respective paths, which arrangements electrically preceding an arrangement for writing the signals on the respective paths. In response to the read signals, collisions are avoided on the communications paths. For example a busy field of a packet on a signal path indicates that the respective path is either busy or not busy. If the path is not busy, the station may write a packet on the path. If the path is busy, the station may overwrite the busy control field for indicating that the station has a packet to transmit and that it is contending for the path. The electrically first station on a path is called a head station while the electrically last station on the path is called an end station. When an end station detects the path as not busy, the end station need not propagate that information to a distant head station because the head and end station functions are colocated in a control station. The control station may initiate a start cycle, thereyby mitigating propagating delay time. Upon detecting an electrical open signal path, each station is adapted such that the station which electrically precedes the open becomes an end station while the station which electrically succeeds the open becomes a head station. Thereby the deleterious effects of an open are mitigated in that the system adaptively is reconfigured to avoid those effects.

BRIEF DESCRIPTION OF THE DRAWING

The invention should become fully apparent when taken in connection with the following detailed description and accompanying drawing in which:

FIG. 2 illustrates bipolar digital signals useful in describing the principles of the invention;

FIG. 3 illustrates a synchronizing signal and digital signal pattern useful in describing the principles of the invention;

FIG. 4 illustrates a tyical packet format including access control field useful in describing the principles of the invention.

DETAILED DESCRIPTION

Figure 1:
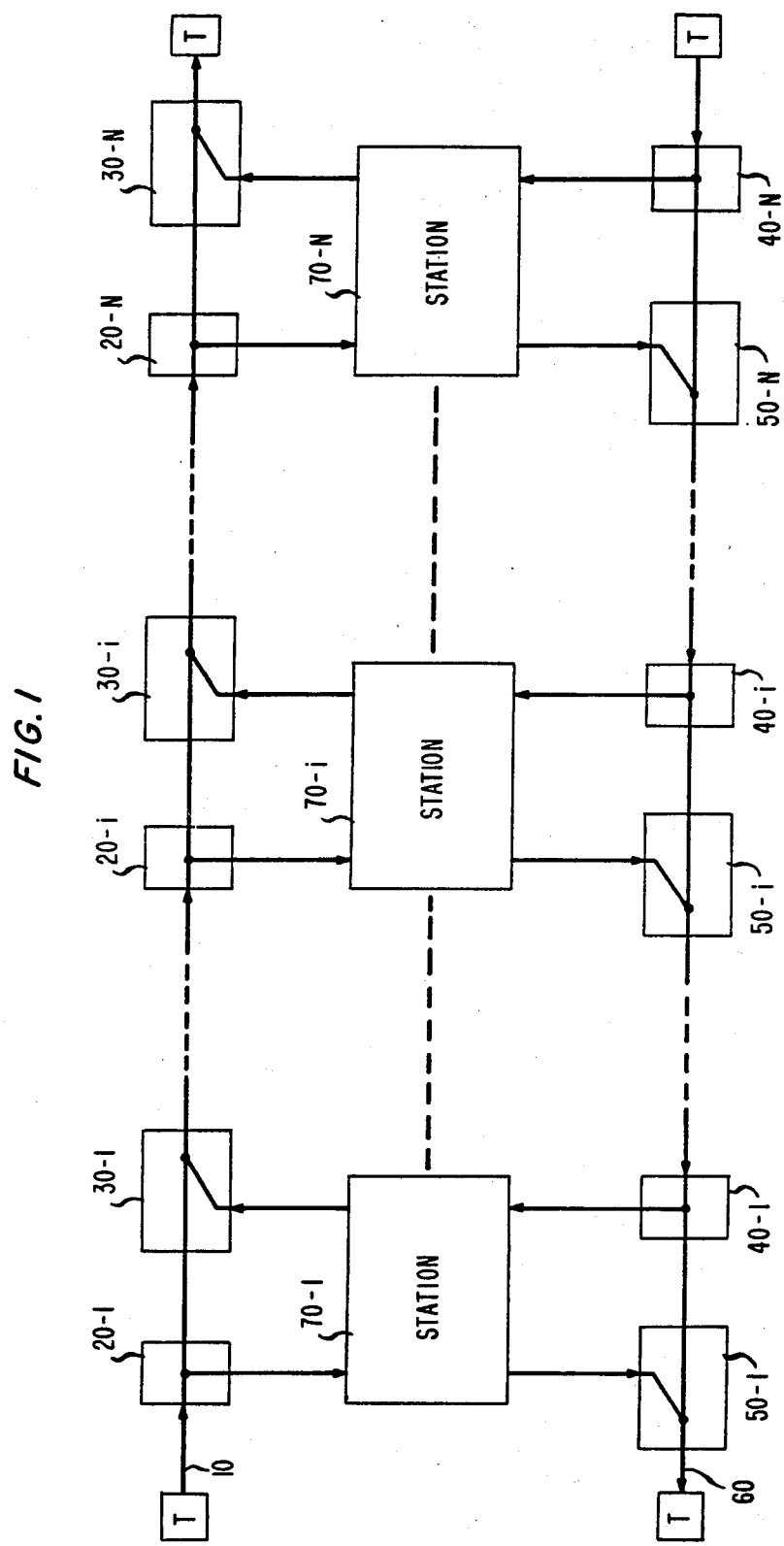
FIG. 1 illustrates an arrangement including a plurality of stations interconnected with two oppositely directed unidirectional communications paths which arrangement is useful in describing the principles of the invention.

Referring to the illustrative structure shown in FIG. 1, which structure is copied from the aforementioned Ser. No. 399,428 application, a first unidirectional communications signal path 10 is illustrated as extended through a plurality of cascaded transmission couplers such as passive read coupler 20-i and passive write coupler 30-i. A second unidirectional signal path 60, which path is oppositely directed with respect to first path 10, is also there illustrated as extended through another plurality of cascaded transmission couplers such as passive read coupler 40-i and passive write coupler 50-i. Thus, each of stations 70-1 through 70-N is twice coupled to each of the two oppositely directed communications paths.

More particularly, on the one hand, nondirectional read couplers 20-i and 40-i are for electrically coupling signals, which are detected on a respective first 10 or second 60 communications path to station 70-i. In that manner, station 70-i may monitor or read signals on both the first path and the second path. On the other hand, directional write couplers 30-i and 50-i are for coupling and inserting or writing signals from station 70-i onto the respective communications path. For example, the inserted signal could, responsive to a signal being priorly read from path 10 through the electrically preceding nondirectional read coupler 20-i, overwrite the first path signal through directional write coupler 30-i, e.g., by the energy of write signal being electrically added to the signal, if any, already on path 10. In parallel fashion, the inserted signal could, responsive to a signal being priorly read from path 60 through electrically preceding nondirectional read coupler 40-i, overwrite the second path signal through write coupler 50-i. In that manner, station 70-i may transmit a signal by causing the signal to be inserted or written on the communications path. As should be clear from FIG. 1, there are actually two transmit sides of the communications system. For example, as to station 70-i transmitting a packet, the packet would be transmitted on communications path 10 if the packet is destined for station 70-k where k is greater than i. On the other hand, if the packet is destined for station 70-j where j is less than i, the packet would be transmitted on communications path 60. The foregoing constraint would not necessarily apply to the structure of FIG. 5, which will become self-evident shortly.

Station 70-i may include station terminal equipment such as a digital computer or a straightforward digital interface unit, the interface unit, for example, for interconnecting paths 10 and/or 60 with another system, the other system perhaps being geographically distant from the instant system. As an aside, it is common in the art that, when the stations are electrically relatively close to each other, e.g., within about two miles of each other, such a system is referred to, among other ways, as a local area network. Thus, in line with this advantage of the structure illustrated in FIG. 1, a plurality of local area networks may be interconnected for forming a still larger communications system.

Before more particularly describing the operation of a system embodying the principles of the instant invention, some ancillary matters are first described.

As to electrical signals on the communications paths, assume for illustration and not by way of limitation a bipolar digital signal of the type illustraated in FIG. 2. Each logic zero is assumed to have a first voltage level potential, e.g., a zero level potential. On the other hand, a logic one or a sequence of consecutive logic ones may be transmitted at a second potential level (e.g., $+V$) until a next logic zero is to be transmitted. The logic zero may be transmitted, as aforedescribed, at the first potential level. After the logic zero or sequence of consecutive logic zeroes is transmitted, a then following logic one or a sequence of consecutive logic ones is transmitted at a third potential level, here the third potential level (e.g., $-V$) is illustratively the inverse of the second potential ($+V$) level. The logic one potential level may continue such alternations after each logic zero or sequence of consecutive logic zeroes.

As to synchronizing digital signals on the communications paths, assume for illustration and not by way of limitation a synchronizing digital signal sequence such as that illustrated in FIG. 3. The there illustrated synchronizing sequence is hereinafter called a sync burst and may be transmitted by any of the stations on a path, the sync burst transmitting station being referred to as the head station. (As will be made clearer hereinafter the head station contemplates certain functions which may also be incorporated in a single control station.) As a further aside, each half of the system, e.g., one half including first path 10 and the other half including second path 60, may simultaneously have a respective head station. Accordingly, for brevity of description, we assume for purposes of illustration that station 70-1 is the "head" station on path 10 while station 70-N is the "end" station on path 10. Conversely, station 70-N is the head station on path 60 while station 70-1 is the end station on path 60.

Continuing with reference to FIG. 3, although other synchronizing sequences could be used, the illustrative sync burst includes a plurality of bipolar violations followed by a predetermined digital sequence. Bipolar violations may include a succession of alternations between the second and the third potential levels with no intervening logic zero. It may be noted that such a sequence of alternations is contrary to the aforedescribed bipolar signal of FIG. 2, hence the term bipolar violation. The biopolar violations may be transmitted from the respective head stations and may be extended through respective read couplers 20-i and 40-i to synchronizing and timing circuitry of station 70-i for bit synchronizing the station circuitry and the respective path digital signals. Following a prefixed number of bipolar violations, the sync burst may further include a predetermined digital sequence such as the Barker sequence "01011100". The Barker sequence may also be transmitted from the respective head stations and may also be extended through respective read couplers 20-i and 40-i to synchronizing and timing circuitry of station 70-i for synchronizing the station circuitry and the path digital signals. As a result, each of the plurality of stations on each of the two paths includes a straightforward arrangement for both bit synchronizing and data synchronizing the station in response to the detection of the sync burst of bipolar violations and Barker sequence.

As to inserting or writing a signal from a station onto a path, subsequent to the transmission of the sync burst, one or more packets of information, e.g., M packets, may be transmitted on the path. Indeed, a packet may, for example, be transmitted in a time slot as a time division multiplexed signal. However, absent a control protocol, collisions between the packets could occur. According to the principles of the instant invention, a hereinafter described control protocol may be used for controlling the signals on the system and for avoiding collisions, for mitigating propagation delay and for reconfiguring the system in the event of an electrical open in either communications path 10 or 60 or both.

As to the instant control protocol, FIG. 4 depicts an illustrative packet of predetermined size and comprising K bits, where for illustration and not by way of limitation K is assumed to equal 160 bits. Also, for illustration, a packet is assumed to include an access control field, which field in turn includes one or more bits. Here, the first eight bits of the illustrative data packet are labelled start cycle, end, dead, dead, busy, dead, dead and dead, respectively, and may comprise an access control field for the instant protocol. The packet may, as is common in the art, also include a destination station address field, a source station address field, a data field, and an error control field. Again, each field may include one or more bits. One error control field may also include a well known cyclic redundancy code (CRC). Also, the packet may be read from or written into a time slot of a time division multiplexed signal on the path.

Now that the above ancillary matters have been described, the following description focuses on the logical interpretation of the access control field.

Firstly, assume, as aforedescribed, that a sync burst has been transmitted from the respective head station on respective paths 10 and 60 for bit and data synchronizing each station. Thereafter, one or more data packets may be transmitted as a time division multiplexed signal. Each data packet is assumed to have the format illustrated in FIG. 4.

Secondly, assume for purposes of illustration and not by way of limitation that each of the N stations may transmit a single packet during a time frame, which time frame is hereinafter referred to as a cycle. The first packet in a cycle would have its start cycle bit set to a logic one by the head station. In general, all other packets in the cycle would have their respective start cycle bit set to a logic zero. Responsive to the detection of a logic one start cycle bit, each respective station on the path is logically alerted that a new cycle is started and accordingly may set a respective "permit register" (hereinafter also called a p-register) to a logic one for indicating that the station may transmit a packet. As hereinafter described, after a station has transmitted a packet, the station resets its permit register to a logic zero for indicating that the station may not transmit a packet. Indeed, each station could have two permit registers, one p-register being related to path 10 and the second p-register being related to path 60. As an aside, a station could transmit more than one packet each cycle. In that regard, see the aforementioned Ser. No. 399,428 application.

Thirdly, each station which has a packet to transmit may, responsive to its respective permit register being set to a logic one, extend a logic one through its write coupler 30-i (or 50-i) to path 10 (or 60) for overwriting the busy bit of the read packet, here illustratively bit 5 of the packet shown in FIG. 4. The overwriting of the busy bit with a logic one may occur whether or not the busy bit being overwritten is already a logic one.

Fourthly, read circuitry of station 70-i includes circuitry for reading the busy bit. Assume that station 70-i has a packet to transmit and that its permit register is set to a logic one. As mentioned, the busy bit is overwritten with a logic one. However, as is evident from FIG. 1, read coupler 20-i (or 40-i) electrically precedes write coupler 30-i (or 50-i) and the two couplers may be a relatively short electrical distance apart. As should also be evident from FIG. 1, some finite time interval may be needed for determining whether or not the packet may be written onto the path, e.g., the determining action including interpreting the contents, or logic value, of the busy bit of the packet being read. Experimentation has indicated that a relatively few bit time intervals allow adequate time for such a determination. Hence, in the instant embodiment, the dead, or "don't care", control bits allow three bit time intervals, e.g., the time interval of dead bits 6, 7 and 8 of the read packet, for allowing an adequate time interval during which read circuitry of station 70-i may interpret of determine the logic value of the busy bit of the packet being read.

On the one hand, if the contents of the busy bit of the packet being read is detected as a logic zero, the packet to be written may be written through write coupler 30-i (or 50-i) onto path 10 (or 60). The station then may reset its permit register to a logic zero for indicating that the station may not transmit a packet.

On the other hand, if the contents of the busy bit of the packet being read is detected as a logic one, the packet to be written is not then written. Indeed, if the packet were written, a collision would occur. Instead, responsive to the busy bit of the read packet being a logic one, write circuitry of station 70-i makes a transition into a wait state and waits until the next nonbusy packet is detected.

Thus, in summary, a station may transmit only when its permit register is set to a logic one and when a read busy bit is a logic zero. After having transmitted a packet, the station sets its permit register to a logic zero. If a station has a packet for transmission and if its permit register is a logic one and if the read busy bit is a logic zero, the station can overwrite the busy bit with a logic one and transmit its packet. Thereafter, as packets flow over respective path 10 or path 60, the packets are read on the receive side of station 70-i through respective read coupler 20-i or 40-i.

Each station 70-i can monitor the path for packets having, among other things, a destination address identifying the respective station as the addressed or called station. Upon detection of a destination address for identifying station 70-i as the addressed station, receive side read circuitry in station 70-i can thereafter read the packet and process the packet in whatever manner the station may have been programmed or adapted to do.

It should be clear that station 70-N would not usually transmit packets on communications path 10. (However, the foregoing constraint would not necessarily apply to the structure of FIG. 5). That is, all packets transmitted from station 70-N would be transmitted on communications path 60. Accordingly, responsive to station 70-N detecting a logic zero busy bit on path 10, station 70-N transmits an end cycle packet on communications path 60. The end cycle packet includes a logic one end cycle bit, which may be conveniently located either after the start cycle bit or after the busy bit which location is shown in FIG. 4 to include a don't care bit. Upon detection by station 70-1 of a logic one end cycle bit on path 60, station 70-1, which is the end station on path 60 but the head station on path 10, may initiate a start cycle packet on communications path 10 for commencing a new cycle. It should also be clear that the foregoing description relative to communications path 10 is substantially identical with respect to communications path 60 with the specific head and end stations functions being reversed.

Of course, it does take some finite time for the end cycle packet to propagate from the end station on one (forward) path to the head station on the one (forward) path with the transmission of the end cycle packet occurring on the other (reverse) path. Recognizing this problem, we propose to merge the head station functions and the end station functions into one colocated station which performs the functions of both the head station and the end station. Inasmuch as the head station and the end station are thusly colocated, the colocated stations can thusly function as, and are hereinafter referred to, as a single control station. The control station, in response to detecting a logic zero busy bit while performing its end station function, can without propagation delay initiate in its head station function a start cycle on the forward path. The foregoing advantage is depicted in the structure illustrated in FIG. 5, which structure makes clear that the resultant structure comprises two unidirectional, but oppositely directed, paths which are interconnected to form two ring networks.

Figure 5:
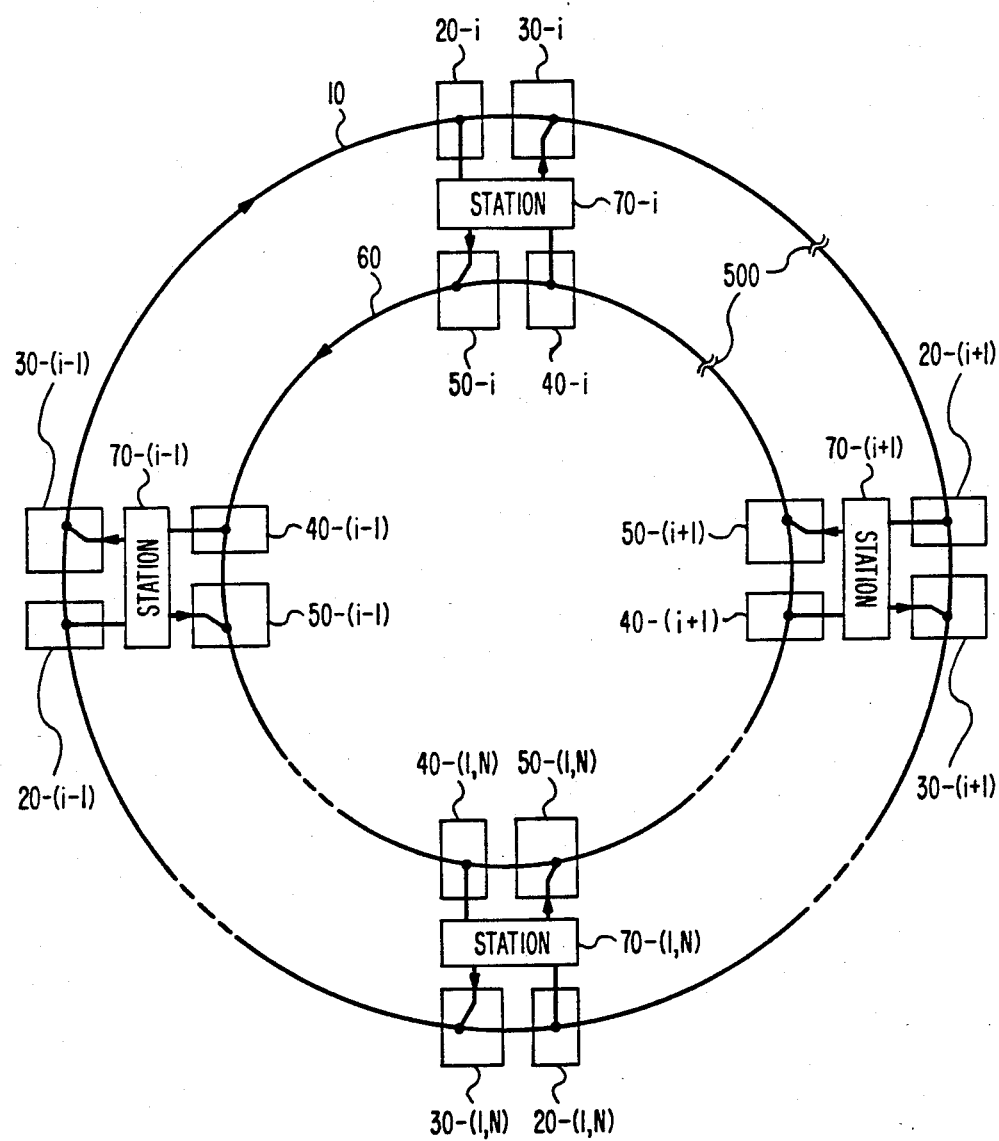
FIG. 5 illustrates an arrangement which modifies the arrangement of FIG. 1 to mitigate propagation delay and to reconfigure the system in accord with the principles of our invention.

Specifically, unidirectional path 10 from FIG. 1 is redrawn to form a unidirectional outer ring 10 of FIG. 5. In parallel fashion, unidirectional path 60 from FIG. 1 is redrawn to form a unidirectional inner ring 60 of FIG. 5. Further, stations 70-1 and 70-N, the head and end stations from FIG. 1, are redrawn as merged to form a single control station 70-(1,N) which functions as both head and end stations for the two oppositely directed, unidirectional single paths (or rings) 10 and 60 of FIG. 5. Of course, and as mentioned with the structure of FIG. 1, an end station, e.g. station 70-N for path 10 and station 70-1 for path 60, would not transmit on the path for which it is an end station. Notwithstanding, the ring structure of FIG. 5 is not thusly constrained. In that manner, our improved structure of FIG. 5 mitigates the end cycle packet propagation delay time problem of the structure of FIG. 1. Specifically, since signals on the outer ring are illustrated as propagating in a clockwise direction on path 10, there will come a time when a packet having a logic zero busy bit will be detected at control station 70-(1,N) through one of its read couplers, here coupler 20-(1,N). In parallel fashion, since signals on the inner ring are illlustrated as propagating in a counter-clockwise direction on path 60, there will come a time when a packet having a logic zero busy bit will be detected at a control station 70-(1,N) through the other of its read couplers, here, coupler 40-(1,N). In either case, station 70-(1,N), while performing an end station function, is adapted to transmit a start cycle packet on the respective signal path in response to detecting the logic zero busy bit on that respective path, thusly also performing a head station function. Thereupon a new cycle is initiated responsive to which the stations 70-i et al may transmit a packet.

Having thus far described an advantage according to an aspect of the principles of our invention, e.g., a mitigation of progapation delay to more quickly start a new cycle, we now turn to another advantage according to another aspect of the principles of our invention. Consider the event in which there is an electrical open in either communications path. According to this aspect of the principles of our invention, each station on the path is adapted to reconfigure itself such that the ring structure of FIG. 5 is adapted to transform to the bus structure of FIG. 1. When in the structure of FIG. 1, the system, stations and protocol can operate in accord with the teachings of the aforecited Ser. No. 399,428 application.

For example, referring to FIG. 5, assume some disaster occurs such that an electrical open occurs either in path 10 or in path 60 or in both paths. The open is assumed to occur at cut 500. An electrical open may be detected by a station in response to detecting the absence of packet signal or synchronizing signals on a path. For example, assume an open occurs at cut 500. As a result, signals on path 10 cannot propagate through cut 500. Hence, station 70-(i+1) through its read coupler 20-(i+1) detects the absence of incoming signals, concludes it is electrically succeeding the open, and adapts itself to be the head station on path 10 as well as the end station on path 60. The ring system of FIG. 5 then functionally reduces to system of FIG. 1 with station 70-(i+1), i.e. the station which electrically succeeds the open, becoming the head station of path 10 and with station 70-i, i.e. the station which electrically precedes the open, becoming the end station of path 10. Of course, the converse in station occurs on path 60, i.e. station 70-i becomes the head station on path 60 while station 70-(i+1) becomes the end station. Each station is then adapted to function as priorly described, e.g. in Ser. No. 399,428, until the electrical open at cut 500 is repaired at which point in time the ring system of FIG. 5 is resumed.

Although the invention has been described and illustrated in detail, it is to be understood that same is by way of illustration and example only. For brevity, some alternative modifications of the principles of the invention have been disclosed. Still other modifications of the principles of the invention will occur to those skilled in the art, e.g., logic values could be inverted or access control field bits could be relocated or the directions of the inner and outer rings could be reversed. Accordingly, the invention is not be considered limited by the embodiment(s) shown and thus the spirit and scope of the invention are limited only by the appended claims.

What is claimed is:

1. A method for controlling digital signals in a communication system, said system including a plurality of stations where at least two of said stations are coupled to both a first and a second signal path and each of the first and second signal paths forms a separate ring, the method comprising the steps of:

generating a separate start cycle packet including a start cycle field by a first one of the plurality of stations for transmission as a start cycle packet on each of the first and second paths;

each station being responsive to the start cycle signal in the start cycle packet on either one of the first and second paths for initializing that station to transmit a packet of information on the path including that start cycle packet;

each station reading signals including a busy control field of each sequential packet from either one of the first and second paths for detecting from the busy control field of each packet whether or not that packet is busy and includes information transmitted by another station in an information field;

each station including information to be transmitted being responsive to both, being initialized by the start cycle signal and the busy control field indicating that a packet is not busy on either one of the two paths for overwriting (a) that packet's busy control field to indicate that the packet is busy and (b) that packet's information field with the information to be transmitted.

2. A method according to claim 1 wherein the method comprises the further step of:

the first one of the stations, generating the start cycle packet, being responsive to signals returning on a signal path ring and a busy control field indicating that a packet on the signal path is not busy for initiating a start cycle packet on said signal path.

3. A method according to claim 2 wherein said first and said second path are, respectively, unidirectional paths for propagating signals in opposite directions.

4. A method according to claim 1 wherein said first and said second paths are, respectively, unidirectional paths for propagating signals in opposite directions.

5. A method according to claim 1 wherein the method comprises the further step of:

responsive to detecting an electrical open in either one of said first and second signal paths, adapting a first station to function as a head station and adapting a section station to function as an end station on the path with the electrical open.

6. A method according to claim 5 wherein, in response to the detection of an electrical open, the first station immediately succeeds the electrical open and the second station immediately precedes the electrical open.

7. A communication system comprising:

a first and a second communications signal path, the first and second signal path being oppositely directed in the form of separate rings and capable of propagating packets of information;

a plurality of stations with at least two of the stations being coupled to both of the first and second signal paths, one of said stations comprising means for generating a separate start cycle packet including a start cycle field for transmission as a first packet period on either one of the first and second paths, each station comprising:

means coupled to at least one of the first and second paths and capable of detecting a start cycle field indicating a start cycle packet for enabling the station to transmit a packet of information on a next available non-busy packet on said at least one of the first and second paths;

means capable of reading a busy control field associated with each packet on the at least one path for detecting whether or not a packet is busy and includes information transmitted by another station in an associated information field of the packet; and means responsive to the detection of the start cycle field and a busy control field indicating that a packet on the at least one of the two paths is not busy for writing the information to be transmitted to another station in the information field of that packet.

8. A communication system according to claim 7 wherein the one of said stations generating a separate start cycle packet further comprises:

means for reading the busy control field of each packet returning on the at least one of the two loop communication paths and for enabling the start cycle packet generating means to generate another start cycle packet on the at least one path in response to the detection of a busy control field of any packet indicating a packet which is not busy.

9. A communication system according to claim 7 wherein each station further comprises:

means capable of detecting an electrical open in either of the first and second communication paths and for adapting (a) a first one of the plurality of stations as a head station on the path with the electrical open and (b) a second one of the plurality of stations as an end station on the path with the electrical open.

10. A communication system according to claim 9 wherein the first one of the plurality of stations immediately succeeds the electrical open and the second one of the plurality of stations immediately precedes the electrical open.

11. Station apparatus adapted for use in a communication system, the system including first and second communication paths in the form of respective rings with each path being capable of progagating packets of information including a start cycle field and a busy control field, the station apparatus comprising:

means for reading the contents of the start cycle field and the busy control field in each packet on at least one of the first and second communication paths;

means for enabling the station apparatus to transmit a packet of information in response to the detection of the start cycle field of a packet comprising a first encoded signal;

means for determining from the signal included in the busy control field of a packet whether or not the packet is busy and contains information being transmitted from one station coupled to the at least one path to another; and means responsive to (a) the enabling of the station apparatus and (b) the busy control field of a packet indicating that the packet on either one of the two communication paths is not busy for writing information to be transmitted into an information field of the packet.

12. Station apparatus according to claim 11 wherein the station apparatus further comprises:
 means responsive to the detection of a busy control field indicating that a packet is not busy for adapting the station apparatus as a control station; and
 means responsive to the station apparatus being adapted as a control station for writing the first encoded signal into the start cycle field.

13. Station apparatus according to claim 11 wherein the station apparatus further comprises:
 means for detecting an electrical open in either one of the first and second communication paths; and
 means, responsive to the electrical open being detected as electrically succeeding said station apparatus, for adapting the station apparatus to function as an end station on the path including the electrical open.

14. Station apparatus according to claim 11 wherein the station apparatus further comprises:
 means for detecting an electrical open in either one of the first and second communication paths; and
 means, responsive to the electrical open being detected as electrically preceding said station apparatus, for adapting the station apparatus to function as a head station on the path including the electrical open.

* * * * *